United States Patent [19]

Shannon

[11] Patent Number: 4,953,751

[45] Date of Patent: Sep. 4, 1990

[54] OVERFLOW PREVENTION FOR SOFT DRINK DISPENSERS

[75] Inventor: Joseph W. Shannon, Kent, Ohio

[73] Assignee: ABC/Sebrn TechCorp., Akron, Ohio

[21] Appl. No.: 330,767

[22] Filed: Mar. 30, 1989

[51] Int. Cl.$^5$ ............................................. B67D 5/30
[52] U.S. Cl. ....................................... 222/14; 222/40; 222/64; 222/641; 222/129.4; 141/198
[58] Field of Search ........................ 222/14, 40, 52, 55, 222/56, 59, 64, 71, 129.1–129.4, 638–642; 141/128, 192, 198

[56] References Cited

U.S. PATENT DOCUMENTS

| | | | |
|---|---|---|---|
| 4,202,387 | 5/1980 | Upton | 222/54 |
| 4,487,333 | 12/1984 | Pounder et al. | 222/71 |
| 4,654,095 | 2/1987 | Coppola | 222/40 |
| 4,711,277 | 12/1987 | Clish | 141/128 |
| 4,712,591 | 12/1987 | McCann et al. | 141/198 |
| 4,735,238 | 4/1988 | Reeves, Jr. | 141/128 |
| 4,800,492 | 1/1989 | Johnson et al. | 222/71 |
| 4,827,426 | 5/1989 | Patton et al. | 222/52 |

*Primary Examiner*—H. Grant Skaggs
*Assistant Examiner*—Steven Reiss
*Attorney, Agent, or Firm*—Renner, Kenner, Greive, Bobak, Taylor & Weber

[57] ABSTRACT

A soft drink dispenser is provided with an electrical circuit path defined between the syrup and soda streams and the cup receiving the drink. By interrupting the path and then reestablishing it, the level of the reservoir of beverage within the cup can be instantaneously determined and the volume of beverage to then be dispensed to achieve a full measure of beverage within the cup, without overflow, can be attained.

12 Claims, 1 Drawing Sheet

OVERFLOW PREVENTION FOR SOFT DRINK DISPENSERS

TECHNICAL FIELD

The invention herein resides in the art of beverage dispensing apparatus and, more particularly, to a soft drink dispenser which includes means for preventing the overflowing of the soft drink from a cup or container receiving the same.

BACKGROUND ART

In the dispensing of soft drinks from fountain heads and the like, a constant problem is the assurance that a full measure of beverage is dispensed into the cup or other container, without the overflowing of beverage over the lip of the cup and down the side thereof. When the level of the beverage within the cup is not within a reasonable distance from the top of the cup, the customer feels that he has been shorted. In like manner, when the beverage is allowed to overrun the cup, not only is expensive waste experienced, but the cup itself may become wet or sticky and, therefore, unsatisfactory to the customer.

Present soft drink dispensers often include measuring devices, measuring either the actual volume of beverage dispensed, or the timing of the dispensing cycle, to assure that a full measure has been dispensed. However, if the operator has placed too much, or too little ice within the cup, the same problems of overflowing or apparent shortages may occur. Similarly, if the customer requests no ice, light ice, or heavy ice, systems which assure the dispensing of a fixed volume of beverage will again result in either apparent shortages or overflows.

Various attempts have been taken in the past to monitor the filling of a cup from a soft drink dispenser to assure the dispensing of a full measure, without objectionable overflow. Consideration has been given to the use of sonic devices or proximity transducers for such systems, but without success. Further, dispensing systems have been configured with probes extending into the cup, or along the side thereof, to shut off the beverage flow instantly upon the sensing of an overflow situation. Such devices, however, raise issues of sanitation problems, since the probes themselves become coated with beverage and syrup, giving rise to a sticky or gummy device which is inserted into a customer's cup. Further, many such units do no prevent an overflow, but actually sense the overflow, terminating dispensing to prevent excessive overflow.

The prior art is devoid of a reliable, durable, and sanitary system which is operative to sense and monitor the actual level of beverage within a container or cup and to terminate the flow of such beverage at a point assuring a full measure of beverage without overflow.

DISCLOSURE OF INVENTION

In light of the foregoing, it is a first aspect of the invention to provide overflow prevention for soft drink dispensers in which the actual level of beverage within a cup is monitored.

Another aspect of the invention is the provision of overflow prevention for soft drink dispensers in which termination of dispensing may be guaranteed at a point short of overflow.

Yet another aspect of the invention is the provision of overflow prevention for soft drink dispensers which assures that the beverage level within a cup will fall within a given distance of the top of the cup.

Yet another aspect of the invention is the provision of overflow prevention for soft drink dispensers which is sanitary in use, obviating the need for probes or the like within the cup itself.

Still another aspect of the invention is the provision of overflow prevention for soft drink dispensers which assures the dispensing of a full volume of beverage, without overflow, irrespective of the size of drink being dispensed.

Yet an additional aspect of the invention is the provision of overflow prevention for soft drink dispensers which is conducive to implementation with state of the art soft drink dispensers.

The foregoing and other aspects of the invention which will become apparent as the detailed description proceeds are achieved by a system for dispensing a drink into a container, comprising: a dispensing head receiving a first conduit defining a first flow path for a first fluid, and a second conduit defining a second flow path for a second fluid; valve means interposed within said first and second conduits for enabling and inhibiting respective flows of said first and second fluids from said first and second conduits; and sensing means interposed within said first and second flow paths for determining a volume of said first and second fluids to be dispensed into the container, assuring the dispensing of a full measure of said first and second fluids into the container without overflowing the container.

DESCRIPTION OF DRAWING

For a complete understanding of the objects, techniques and structure of the invention, reference should be had to the following detailed description and accompanying drawing wherein.

BEST MODE FOR CARRYING OUT THE INVENTION

Figure 1:
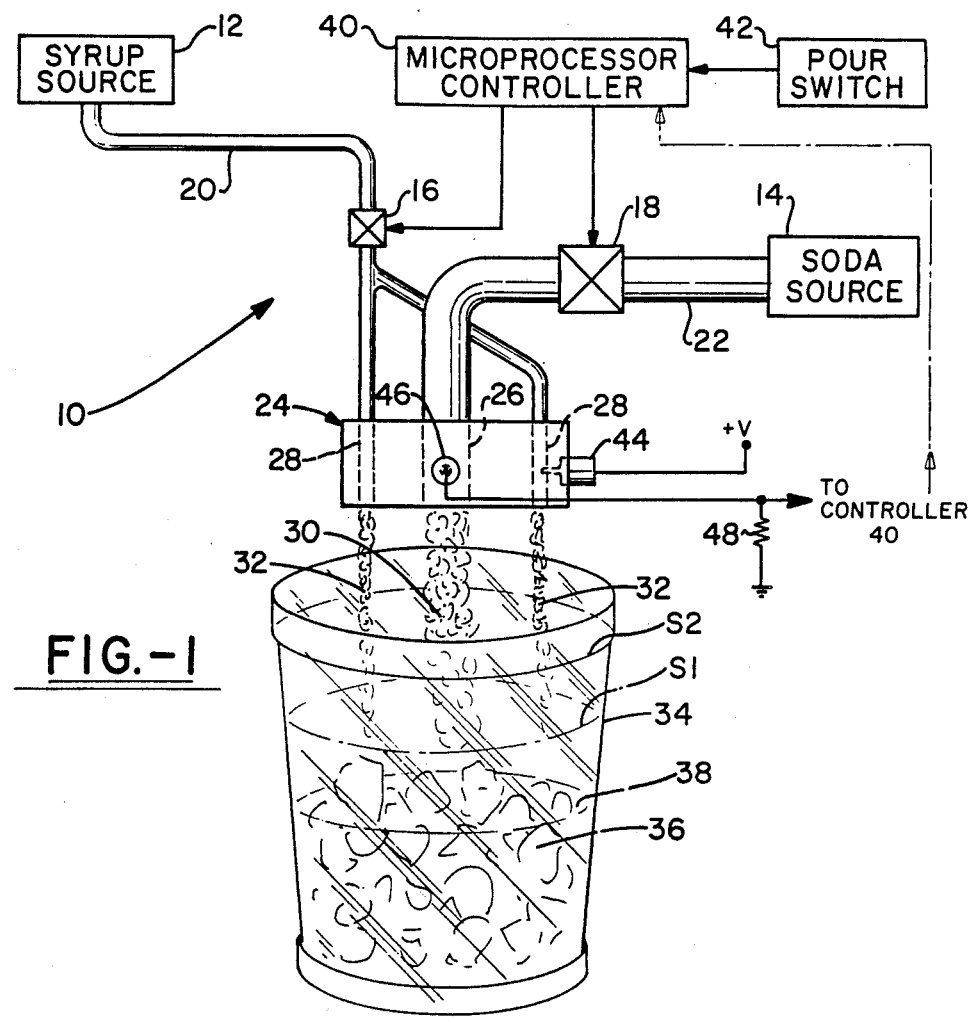
FIG. 1 is a diagrammatic illustration view of the dispensing system of the invention.

Referring now to the drawing, and more particularly FIG. 1, it can be seen that a soft drink dispensing system is designated generally by the numeral 10. As shown, the system 10 includes a syrup source 12 and a soda source 14, it being understood that a soft drink is generally comprised of a combination of syrup and soda. Solenoid dispensing valves 16,18 are respectively interposed in the syrup conduit 20 and soda conduit 22. As shown, the conduit 20 passes syrup from the syrup source 12 to a dispensing head 24, while the conduit 22 is operative to past soda from the soda source 14 to the same dispensing head 24.

As will be readily appreciated by those skilled in the art, the dispensing head 24 may take any of numerous configurations. However, it is preferred that there be provided a central passage 26 in communication with the conduit 22 for defining the flow path of the soda through the head 24 and into a dispensing stream 30. In similar fashion, a pair of passages 28, one on either side of the passage 30, are provided for defining a flow path of syrup to a dispensing stream 32. In a preferred embodiment, the dispensing head 24 is simply a plastic block with the passages 26,28 bored therein. While the illustration of FIG. 1 shows a single syrup source, it will be understood that various syrup sources may be employed, depending upon the types or flavors of soft drinks to be dispensed. For an appreciation of the concept of the invention, however, only a single syrup source need be provided.

It is an important feature of the invention that the dispensing head 24 be of such nature that the syrup streams 32 are maintained in spaced apart relation with respect to the soda stream 30. Unlike other diffusers known in the art, the syrup and soda in the system 10 do not contact each other or mix with each other until they are received within the cup 34 positioned beneath the dispensing head 24. Indeed, as is now known in the art, to minimize foaming, turbulence, and agitation in the dispensing cycle, it is preferred that the soda and syrup not mix until they contact the ice 36 maintained within the cup 34. As shown, the cup 34 receives a reservoir 38 of soda and syrup which self-mixes upon the ice 36 to constitute the desired soft drink. Of course, the reservoir 38 rises within the cup 34 during the dispensing cycle.

As is also now known in the art, a controller 40 is provided for regulating the actuation of the solenoid valves 16,18. The controller 40 typically includes a microprocessor which contains data respecting the timing for the actuation of the valves 16,18, as well as the requisite look-up tables and formulas respecting the various beverages which may be dispensed. A pour switch 42, actuated by an operator, communicates with the microprocessor or controller 40 to indicate the size and nature of the drink being requested. For example, the pour switch 42 may indicate that a small, medium, or large drink has been selected, and may also indicate the specific nature or brand of the selected drink.

The foregoing structure is presently well known in the art. In operation, a cup 34 is filled with an appropriate amount of ice and placed beneath the dispensing head 24. An appropriate pour switch 42 is then actuated, advising the microprocessor 40 of the size and nature of the drink requested. The microprocessor then controls the timing and sequencing of the actuation of the valves 16,18 to assure that the requisite volumes of soda and syrup ar dispensed. With the syrup and soda being dispensed under controlled pressure heads, the volume of syrup and soda which is dispensed becomes a function of the time that the solenoid valves 16,18 are actuated. Presently known systems can adjust this timing as a function of the pressure head on the syrup or soda, as well as the temperatures of the same. Such structure and capability, while being well known to those skilled in the art, is not of particular importance to an understanding of the concept of the instant invention.

With continued reference to FIG. 1, it can be seen that a probe 44 enters the dispensing head 24 and one of the syrup passages 28. The probe 44 is connected to a positive voltage source V. Similarly, a probe 46 passes into the dispensing head 24 into the central passage 26 for the soda. The probe 46 passes to controller 40 by means of an electrical conductor which is interconnected with a pull-down resistor 48, connected to ground. The probes 44,46 may be presented in the form of screws or other appropriate electrical connectors, the same preferably being of stainless steel or other suitable construction.

It will be readily appreciated that as the soda stream 30 and syrup stream 32 fill the reservoir 38 of the cup 34, an electrical path is connected between the voltage source V, probe 44, syrup stream 32, the top surface of the reservoir 38, the soda stream 30, probe 46, and pull-down resistor 48. As both the syrup and soda flow simultaneously, the controller sees a signal substantially equal to the voltage V, reduced only by the characteristic resistance of the syrup and soda. In the event of termination of flow of either the syrup stream 30 or soda stream 32, or both, the controller 40 sees a ground signal from the pull-down resistor 48.

It should now be readily appreciated that the electrical path defined above provides a means for the controller 40 to monitor the rising surface level of the reservoir 38. By interrupting either of the streams 30,32, a reference can be established which allows a determination of the location of the top surface of the reservoir 38 when the interruption ceases. A thorough understanding of this technique can be appreciated from the example given below, and with reference to the timing chart of FIG. 2.

Figure 2:
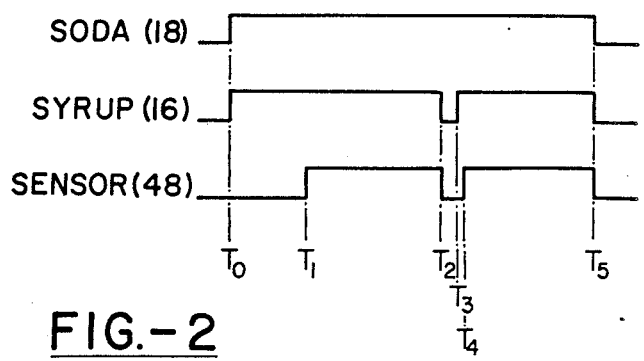
FIG. 2 is a timing chart of the operation of the system of FIG. 1.

Assume that a customer has ordered a large diet soft drink. The operator obtains a cup of the appropriate size for a "large" drink. He then fills the cup approximately ⅓ full of ice, an appropriate amount for a typical drink. The cup 34 is then placed beneath the dispensing head 24 and an appropriate pour switch 42, indicating the size and type of drink requested, is actuated. The controller 40 then actuates the syrup valve 16 and soda valve 18 at time $T_0$. At time $T_1$, the reservoir 38 in the cup 34 is sufficient that an electrical path is completed between the voltage source V and resistor 48 through the soda and syrup streams 30,32. The dispensing continues for a period of time dependent upon the size of the drink requested. With the syrup and soda being dispensed at known flow rates, the volume of beverage dispensed at any given period of time is readily known. The microprocessor 40 controls the system 10 such that the flow of syrup is interrupted for a brief duration of time when the cup 34 should be approximately three-fourths full. At this point in time, the surface of the reservoir 38 should extend above the level of ice 36 within the cup 34. This level is shown as S1 in FIG. 1. The time at which this level is reached will, of course, be dependent upon the size of drink being dispensed. Such data is, however, readily available to the microprocessor 40 via the pour switch 42. In any event, at time $T_2$, when the dispensing should be approximately three-fourths completed, the valve 16 is closed for a very short duration of time. As shown, this termination of the stream 32 immediately breaks the electrical path from the voltage source V to the resistor 48, as indicated in FIG. 2. Subsequently, on the order of milliseconds thereafter, the valve 16 is reopened at time $T_3$. However, the electrical path remains broken until the new syrup stream 32 contacts the surface of the reservoir 38 at time $T_4$. The delay between $T_3$ and $T_4$ is directly proportional to the distance from the dispensing head 24 to the top surface of the reservoir 38 and, accordingly, is directly proportional to the distance between the top surface of the reservoir 38 and the desired dispensing level S2 to the beverage within the cup 34. Knowing the difference between the actual surface level S1 and desired surface level S2, and knowing the flow rates of the soda stream 30 and syrup streams 32, the microprocessor can then time out the dispensing cycle at the exact time necessary to assure that the beverage flow ceases at the level S2, at time $T_5$. Accordingly, a full measure of beverage is dispensed without overflow.

It will be readily appreciated that the controller or microprocessor 40 need only contain a data base establishing the final desired level S2 for each of the various sizes of beverages to be dispensed, and a corresponding time $T_2$ to interrupt syrup flow for each of the various drink sizes. With that information, along with information respecting the rate of syrup and soda flow, the microprocessor 40 can carefully control and regulate the dispensing of the soft drink components to assure full measure dispensing without overflow.

It should now be readily appreciated to those skilled in the art that the concept of the invention is to provide a circuit path between the fluids being dispensed, interrupting that circuit path for a brief moment at a predetermined time dependent upon the size of drink requested, determining from that interruption the exact volume of drink and ice then in the cup, thence allowing the continued dispensing of ingredients for a period of time sufficient to allow the reservoir to increase to the final desired level. The concept of the invention may be employed with any of various types of dispensing heads or systems. Systems that sequence the dispensing of syrup and soda can employ the concept of the invention equally as well as those which provide for a continuous simultaneous pour of the ingredients. Further, the concept of the invention allows for a full measure of dispensing whether the customer has requested less or more ice than is traditionally placed into the cup, and irrespective of any error on behalf of the operator regarding the amount of ice actually placed in the cup.

Thus it can be seen that the objects of the invention have been satisfied by the structure presented hereinabove. While in accordance with the patent statutes, only the best mode and preferred embodiment of the invention has been presented and described in detail, it is to be understood that the invention is not limited thereto or thereby. Accordingly, for an appreciation of the true scope and breadth of the invention, reference should be had to the following claims.

What is claimed is:

1. A system for dispensing a drink into a container, comprising:
    a dispensing head receiving a first conduit defining a first flow path for a first fluid, and a second conduit defining a second flow path for a second fluid;
    valve means interposed within said first and second conduits for enabling and inhibiting respective flows of said first and second fluids from said first and second conduits; and
    sensing means interposed within said first and second flow paths for determining a volume of said first and second fluids to be dispensed into the container, assuring the dispensing of a full measure of said first and second fluids into the container without overflowing the container, said sensing means determining said volume at a specific time following commencement of dispensing of said first and second fluids by actuation of said valve means, said valve means interrupting flow of one of said fluids at said specific time.

2. The system according to claim 1 wherein an electrical path is defined between said first and second flow paths and a volume of said first and second fluids received within the container.

3. The system according to claim 2, wherein said first and second fluids flow at a fixed rate of volume per unit of time.

4. The system according to claim 3, wherein said interruption of said flow of one of said fluids by said valve means breaks said electrical path.

5. The system according to claim 4, wherein said electrical path is reestablished at a time period following termination of said interruption of said flow of one of said fluids, said time period establishing said volume of said first and second fluids to be dispensed to assure said full measure without overflowing.

6. The system according to claim 5, wherein said first fluid is soda and said second fluid is syrup.

7. The system according to claim 6, wherein said sensing means comprises an electrical conductor in each of said flow paths, one of said electrical conductors being connected to a voltage source.

8. The system according to claim 7, wherein said fluid, the flow of which is interrupted, is said syrup.

9. The system according to claim 5, wherein said first and second fluid paths are separated from each other such that said first and second fluids do not contact each other until received in a mass volume in the container.

10. A system for dispensing a drink into a container, comprising:
    a dispensing head receiving a first conduit defining a first flow path for a first fluid, and a second conduit defining a second flow path for a second fluid;
    valve means interposed within said first and second conduits for enabling and inhibiting respective flows of said first and second fluids from said first and second conduits; and
    sensing means interposed within said first and second flow paths for sensing completion of an electrical connection between said first and second flow paths.

11. The system according to claim 10 wherein said sensing means, upon sensing said completion of said electrical connection, determines a volume of said first and second fluids to be dispensed into the container.

12. The system according to claim 10, wherein said electrical connection is completed by a common surface contacted by said first and second flow paths.

* * * * *